T. H. Hutchinson.
Churn.
No. 85,933. Patented Jan. 19, 1869.
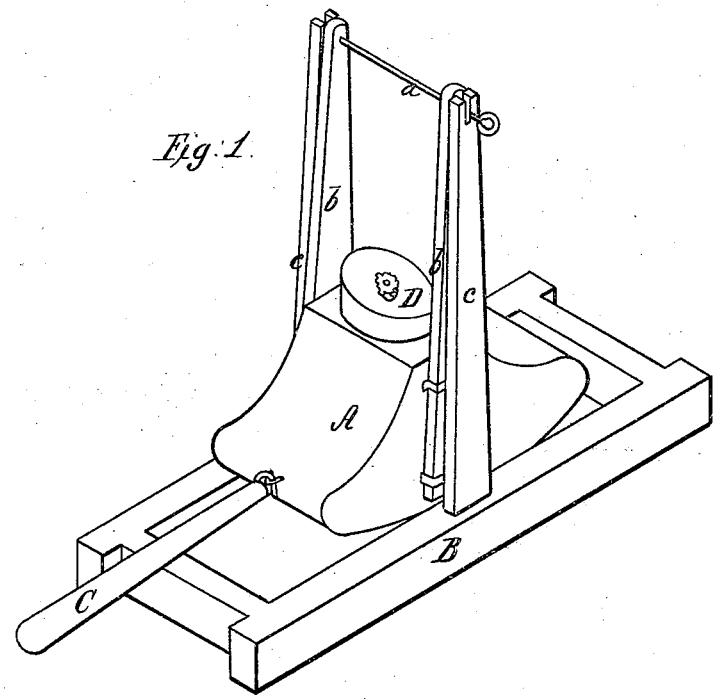
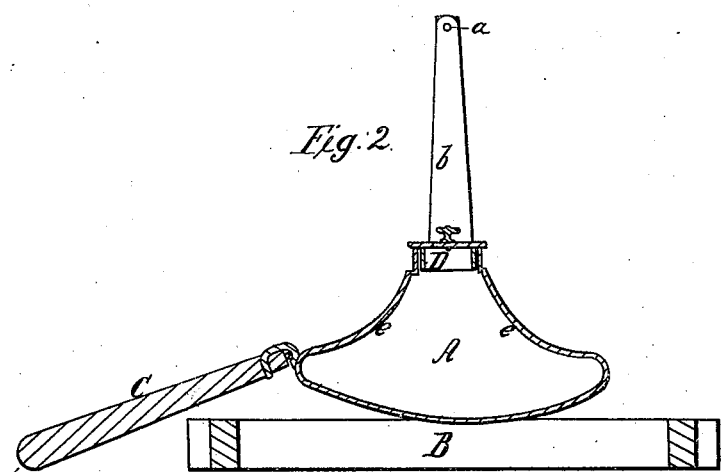
Witnesses:
Geo. A. Loring
Edward Griffith
Inventor:
Timothy H. Hutchinson
by his attorney

TIMOTHY H. HUTCHINSON, OF GORHAM, NEW HAMPSHIRE.

Letters Patent No. 85,953, dated January 19, 1869.

IMPROVEMENT IN CHURNS.

The Schedule referred to in these Letters Patent and making part of the same.

*To all to whom these presents shall come:*

Be it known that I, TIMOTHY H. HUTCHINSON, of Gorham, in the county of Coos, and State of New Hampshire, have invented a new and improved Churn; and do hereby declare the following to be a full, clear, and exact description thereof, reference being had to the accompanying drawings, making part of this specification, and in which—

Figure 1 is a perspective view, and

Figure 2, a vertical and longitudinal section of the aforesaid invention.

Its object is to produce a simple, cheap, and effective churn.

The invention consists of a vibrating receptacle for the cream, formed and constructed as hereinafter described, so as to admit of apertures or openings being made in the receptacle for the circulation of air therein, without danger of the cream being thrown out.

In the drawings above referred to—

A denotes the receptacle, in which the cream is placed, constructed of wood, tin, or any material which may be found to serve best, and so hung from and vibrating upon the pin *a*, by means of the arms *b b* and standards *c c*.

B is the frame, supporting the churn.

C is the handle or connecting-rod, by means of which a swinging motion is imparted to the receptacle A.

The receptacle, as shown in the drawings, with its bottom slightly curved, and its sides, *e e*, brought back over the bottom, so that when the cream, during the vibratory movement of the churn, is thrown from end to end of the receptacle, the parts *e* will prevent all splashing and scattering of the liquid.

By reason of this formation, the cover D, which fits over the top of the vessel, can be perforated, to allow a circulation of air, without fear of the cream being thrown out during its agitation; and in this manner I attain an important advantage, which has not heretofore been found in churns of this class.

In operating the above-described apparatus, a suitable quantity of cream is placed within the receptacle A. It is very beneficial to have a circulation of air, and this may be obtained by partially covering the entrance with the cover D, or by means of perforations in the cover D, or it may be left off entirely.

A person may be seated, and, by taking hold of the end of the handle or connecting-rod C, with the hands elevated nearly to the height of the chin, and the elbows near the body, the receptacle A may be swung back and forth, five or six inches, with great ease.

I have found that, after a few vibrations, when the cream has obtained the motion, it requires less power than when empty, and that a very weak person can produce butter in a few minutes.

The vibratory motion imparted to the receptacle, causes the cream to flow along the bottom, till it strikes the end, and then is thrown upward and backward, but is prevented from being thrown out by the formation at *e e*.

This motion, without the aid of any inside machinery, has been found to work successfully and quickly.

The butter forms in ellipsoids, somewhat smaller than a hen's egg, and remarkably free from buttermilk.

The vibratory motion of the receptacle may be obtained by the aid of machinery.

Having described my invention, I would state, in conclusion, that I do not claim broadly a churn in which the cream-receptacle has a vibratory or swinging motion; but What I do claim, and desire to secure by Letters Patent, is—

The employment, in churns in which the cream-vessel or receptacle has a vibratory or swinging movement, as herein described, of a cream-receptacle, A, the bottom and sides, *e*, of which are constructed and formed substantially in the manner and for the purposes herein shown and set forth.

TIMOTHY H. HUTCHINSON.

Witnesses:
JOHN E. WILLIS,
LAURE WILLIS.